(12) United States Patent
Yoon et al.

(10) Patent No.: US 8,645,656 B2
(45) Date of Patent: Feb. 4, 2014

(54) FLASH MEMORY CONTROLLER

(71) Applicant: Marvell International Ltd., Hamilton (BM)

(72) Inventors: Tony Yoon, Cupertino, CA (US); Akio Goto, Saitama (JP); Chi Kong Lee, Fremont, CA (US); Masayuki Urabe, Kanagawa (JP)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/874,218

(22) Filed: Apr. 30, 2013

(65) Prior Publication Data
US 2013/0290614 A1   Oct. 31, 2013

Related U.S. Application Data

(62) Division of application No. 12/241,000, filed on Sep. 29, 2008, now Pat. No. 8,438,356.

(60) Provisional application No. 60/976,624, filed on Oct. 1, 2007, provisional application No. 60/976,616, filed on Oct. 1, 2007.

(51) Int. Cl.
G06F 12/00   (2006.01)
G06F 13/00   (2006.01)

(52) U.S. Cl.
USPC ........... 711/167; 711/100; 711/102; 711/103; 711/154; 711/169

(58) Field of Classification Search
USPC ................ 711/100, 102, 103, 154, 167, 169
See application file for complete search history.

(56) References Cited

U.S. PATENT DOCUMENTS

| | | | |
|---|---|---|---|
| 6,215,703 B1 | 4/2001 | Bogin et al. | |
| 6,859,856 B2 | 2/2005 | Piau et al. | |

OTHER PUBLICATIONS

International Search Report and Written Opinion of the International Searching Authority, PCT/US08/78462, Dec. 5, 2008, 10 pages.
International Preliminary Report on Patentability for App. Ser. No. PCT/US2008/078462, dated Apr. 7, 2010, 6 pages.

*Primary Examiner* — Midys Rojas

(57) ABSTRACT

A method includes, in at least one aspect, asserting a control signal to one or more devices, determining an initial wait time after asserting the control signal, issuing a first command based on the initial wait time, determining a first interval time associated with the first command and a second command, and issuing the second command based on the first interval time.

20 Claims, 11 Drawing Sheets

FLASH MEMORY CONTROLLER

CROSS-REFERENCE TO RELATED APPLICATIONS

This application is a divisional of U.S. patent application Ser. No. 12/241,000, titled "FLASH MEMORY CONTROLLER," filed on Sep. 29, 2008, which claims priority to U.S. Provisional Application Ser. No. 60/976,616, titled "SSD CONTROLLER INVENTION #1," filed on Oct. 1, 2007, and U.S. Provisional Application Ser. No. 60/976,624, titled "SSD CONTROLLER INVENTION #2," filed on Oct. 1, 2007, the disclosures of each of which are incorporated herein by reference in their entirety.

TECHNICAL FIELD

The subject matter of this application is generally related to memory devices.

BACKGROUND

Many electronic devices include embedded systems with central processor units (CPUs) to control the operation of the devices providing greatly enhanced functionality and operational flexibility. Typically, non-volatile memory is included as a portion of the embedded system to store operating system program code and data for operating the embedded system. Recently, embedded systems have begun to use flash memory for the non-volatile memory. Flash memory may advantageously be reprogrammed while also providing non-volatile storage of information.

SUMMARY

Methods, systems and computer program products for implementing a polling process among one or more flash memory devices are described. In some implementations, the polling process may include sending a read status command to a flash memory device to detect the ready or busy state of the flash memory device. A status register may be included in the flash memory device for storing a status signal indicating an execution state of a write (or erase) operation. A solid state drive system may perform the polling process by reading the status register of the flash memory device.

In some implementation, a method is described that includes asserting a control signal to one or more devices, determining an initial wait time after asserting the control signal, issuing a first command based on the initial wait time, determining a first interval time associated with the first command and a second command, and issuing the second command based on the first interval time.

In some implementation, a method is described that includes controlling a plurality of memory devices including a first group of memory devices and a second group of memory devices, determining a first period associated with the first group of memory devices, issuing a first command to the first group of memory devices based on the first period, determining a second period associated with the second group of memory devices, and issuing a second command to the second group of memory devices based on the second period.

In some implementation, a device is described that includes a first programmable timer to specify an initial wait time associated with issuing one or more commands to at least one device, and a second programmable timer to specify an interval time to control a period between each issued command In some implementation, a device is described that includes a bus to receive one or more commands to one or more memory devices and to control the one or more memory devices based on the issued commands, and a memory controller to perform data polling while the issued commands are being processed by the one or more memory devices The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Flash Memory Overview

Figure 1:
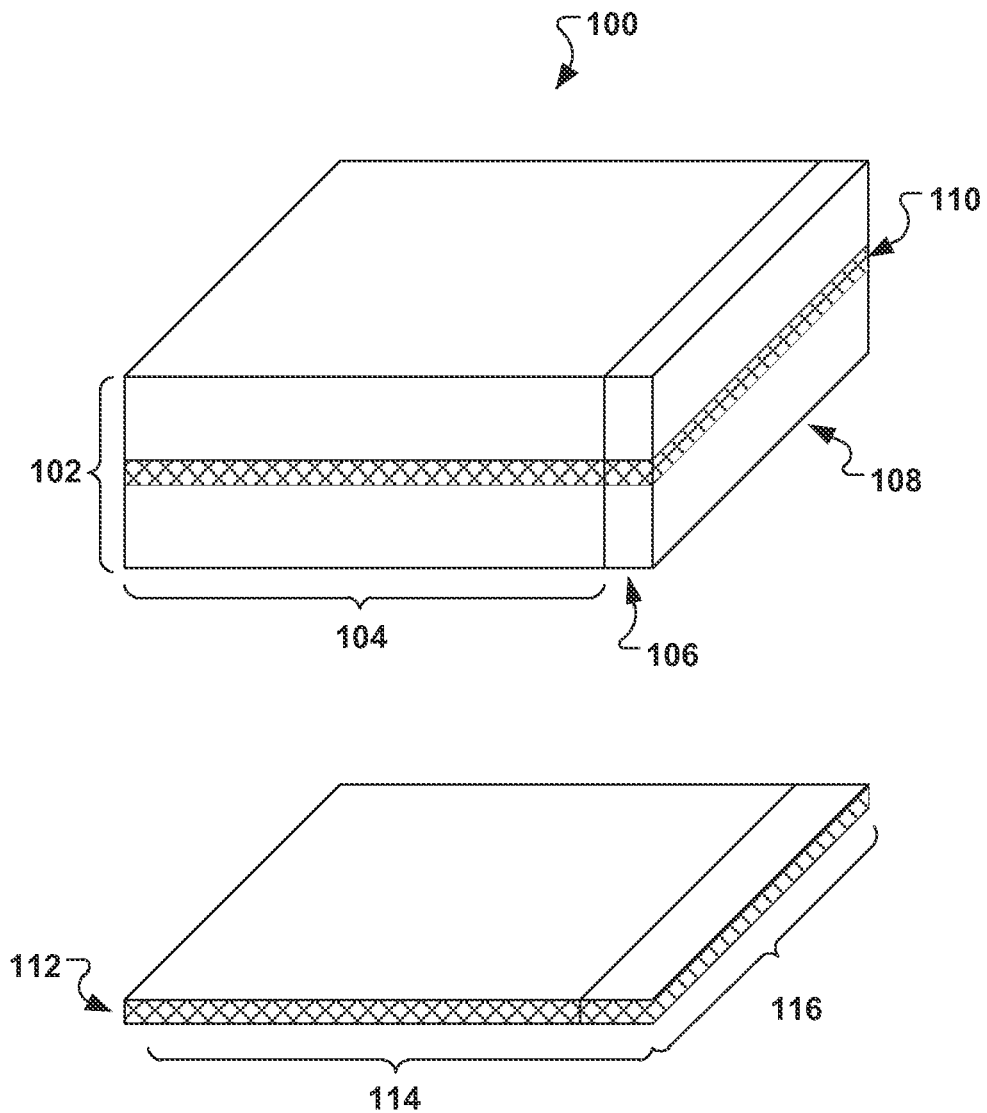
FIG. 1 shows a block diagram of an example memory array.

The use of memory devices, such as flash electrically erasable programmable read only memory (EEPROM), is becoming more widespread. For example, jump drives, memory cards, and other nonvolatile memory appliances are commonplace in cameras, video games, computers, and other electronic devices. FIG. 1 shows a block diagram of a memory array 100.

As shown in FIG. 1, a memory array 100 may be organized in bits. For example, the memory array 100 may include 8-bit depth 108. The memory array 100 also may be organized in bytes. For example, the memory array 100 may include a portion 104 containing 2k bytes, and a portion 106 containing 64 bytes. The memory array 100 further may be organized into pages. For example, the memory array 100 may include 512K pages 102. A single page 112 may be organized into two portions: a first portion 114 (e.g., portion 104 representing 2k bytes), and a second portion 116 (e.g., a portion 106 representing 64 bytes). The second portion 116 may generally correspond to an eight-bit wide data input/output (I/O) path (e.g., I/O [0]-I/O [7]). Even further, the memory array 100 may be arranged in blocks. For example, the memory array 100 may include a block 110, which equates to 64 pages. In all, an 8-Mb memory device may be formed using the foregoing bits, bytes, pages and blocks.

The memory array shown in FIG. 1 may be configured as a flash memory. In some implementations, the flash memory may be a "NAND" type flash memory. NAND flash memory generally has faster erase and write times, higher density, lower cost per bit, and more endurance than NOR-type flash memory. NAND flash memory may be coupled with a NAND flash I/O interface. The NAND flash I/O interface, however, typically allows only sequential access to data. Of course, the memory array shown in FIG. 1 also may be of the form of any one of a NOR Flash EEPROM, AND Flash EEPROM, DiNOR Flash EEPROM, Serial Flash EEPROM, DRAM, SRAM, ROM, EPROM, FRAM, MRAM, or PCRAM.

A NAND flash I/O interface may include multiple pins each corresponding to a specific function. An example interface is shown in Table 1.

TABLE 1

| PIN | PIN Function |
|---|---|
| I/O [7:0] | Data in/out |
| CLE | Command latch enable |
| ALE | Address latch enable |
| CE_ | Chip enable |
| RE_ | Read enable |
| WE_ | Write enable |
| WP_ | Write protect |
| R/B_ | Read/busy output |

As shown in TABLE 1 above, various pin functions may correspond to designated pins in the interface.

Exemplary Timing Diagram for Data Read Operation

Figure 2A:
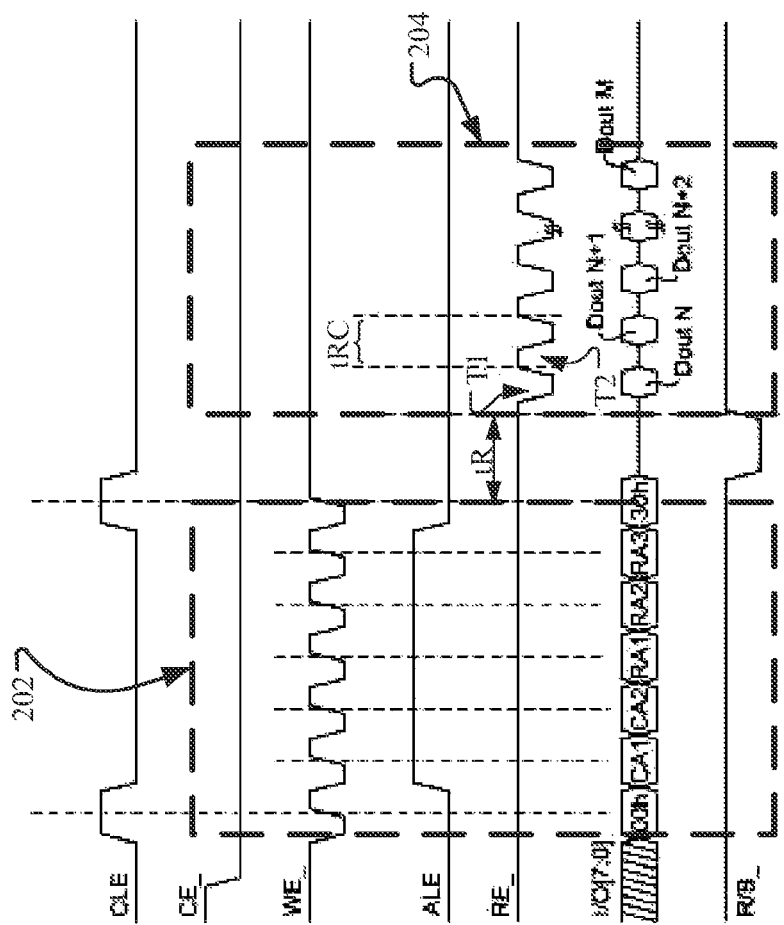
FIG. 2A shows a timing diagram associated with each pin in an example NAND flash interface during a data read operation.

FIG. 2A shows an example timing diagram associated with each pin in a NAND flash interface during a data read operation. Referring to FIG. 2A, region 202 may represent a period during which one or more commands are being sent to a flash memory device, while region 204 may represent a period during which data are being transferred to/from the flash memory device. As shown, the write enable signal "WE_" may be pulsed (e.g., at a 25-ns period) to allow row address (e.g., RA 1, RA 2, and RA 3) and column address (e.g., CA 1 and CA 2) information to be latched in the NAND flash memory device. Command "00h" appearing on the data in/out I/O [7:0] pin may indicate a read address input, while command "30h" may indicate a read start. Other commands also may be used. For example, other memory commands may include, but are not limited to read operations, write operations, erase operations, read status operations, read ID operations, write configuration register operations, write address operations, and reset operations. As an example, command "05h" may represent a random data read command; command "10h" may represent a page program command; command "20h" may represent a chip erase command; command "21h" may represent a sector erase command; command "30h" may represent a read start command; command "35h" may represent a page read for copy command; command "39h" may represent a write device address command; command "60h" may represent a block erase command; command "70h" may represent a read status command; command "80h" may represent a serial data input (writer to buffer) command; command "85h" may represent a random data input command; command "8Fh" may represent a target address input for copy command; command "90h" may represent a read device type command; command "A0h" may represent a write configuration register command; command "C0h" may represent a program/erase suspend command; and command "D0h" may represent a program/erase command; and command "FFh" may represent a reset command, to name a few examples. An example of row and column address multiplexing on the data in/out pins (e.g., I/O[7:0]) may be as shown below in TABLE 2.

TABLE 2

| CYCLE | I/O [0] | I/O [1] | I/O [2] | I/O [3] | I/O [4] | I/O [5] | I/O [6] | I/O [7] |
|---|---|---|---|---|---|---|---|---|
| $1^{st}$ Cycle: Column Address | A0 | A1 | A2 | A3 | A4 | A5 | A6 | A7 |
| $2^{nd}$ Cycle: Column Address | A8 | A9 | A10 | A11 | L | L | L | L |
| $3^{rd}$ Cycle: Column Address | A12 | A13 | A14 | A15 | A16 | A17 | A18 | A19 |
| $4^{th}$ Cycle: Column Address | A20 | A21 | A22 | A23 | A24 | A25 | A26 | A27 |
| $5^{th}$ Cycle: Column Address | A28 | A29 | A29 | L | L | L | L | L |

In some implementations, higher address bits may be utilized for addressing larger memory arrangements (e.g., A30 for 2 Gb, A31 for 4 Gb, A32 for 8 Gb, A33 for 16 Gb, A34 for 32 Gb, A35 for 64 Gb and the like).

Meanwhile, with read enable signal "RE_" pulsing, data such as $D_{out}N$, $D_{out}N+1$, $D_{out}N+2$, . . . $D_{out}M$ may be read from the NAND flash memory device. The read/busy output signal "R/B_" in a particular logic state may indicate whether the output is busy. For example, the read/busy output signal "R/B_" in a low logic state may indicate a busy state at the output. In this example, the read/busy output signal "R/B_" may go logic high (i.e., become logic high which indicates a ready state) some period of time after the last rising edge of write enable signal "WE_".

As shown, the "tR" period, which indicates a data transfer time for data to transfer from a cell to an internal page buffer, may span from the read start command "30h" to the rising edge of the ready/busy output signal "R/B_", and indicates a reading time for reading data. In some implementations, the "tR" period may determine the performance of a solid state drive system (e.g., solid state drive system 300 shown in FIG.

3) for READ operation. In some implementations, a long "tR" period may impose a longer wait time for a solid state controller (e.g., solid state controller 308) before the READ data may be available to the controller.

Before the data becomes ready, the NAND flash I/O interface may be idle and consume unnecessary bandwidth. Thus, it may be desirable to constantly maintain the NAND flash I/O interface in a busy state to achieve bandwidth. For example, if the NAND flash I/O interface is running at tRC=25 ns, the upper limit of an achievable bandwidth may be 40 MB/s (e.g., based on an assumption that a 8-bit data bus is used, and that the NAND flash memory has unlimited bandwidth such that data may continuously be sent from the NAND flash memory to the solid state controller). However, this objective may be difficult to achieve given the "tR" period to read a page from a memory cell in a NAND flash memory to an internal buffer before returning the read data to the solid state controller.

Thus, in some implementations, multiple devices (e.g., multiple chip enable signals) may be bundled into a single channel while sharing a same NAND flash I/O interface such that the "tR" time may be covered as much as possible while allowing data to be available from at least one device of the same channel. In some implementations, the data transfer time may be in the range of about 25 µs for a single level cell (SLC) device or in the range of about 60 µs for a multi-level cell (MLC) device, as will be discussed in greater detail below. During the "tR" period, the ready/busy output signal "R/B_" may be asserted as a logical "0", indicating that the flash memory is in a busy state, during which data, for example, may not be written or erase.

Single Level Cell and Multi-Level Cell Devices Overview

Each cell in a memory device can be programmed as a single bit per cell (i.e., single level cell—SLC) or multiple bits per cell (i.e., multiple level cell—MLC). Each cell's threshold voltage generally determines the type of data that is stored in the cell. For example, in a SLC memory device, a threshold voltage of 0.5V may indicate a programmed cell (i.e., logic "0" state) while a threshold voltage of −0.5V may indicate an erased cell (i.e., logic "1" state).

As the performance and complexity of electronic systems increase, the requirement for additional memory in a system also increases. However, in order to continue to reduce the costs of the system, the parts count typically must be kept to a minimum. In a memory application, this can be accomplished by increasing the memory density of an integrated circuit. Specifically, memory density can be increased by using MLC memory devices. MLC memory devices can increase the amount of data stored in an integrated circuit without adding additional cells and/or increasing the size of the die. MLC memory devices can store two or more data bits in each memory cell. However, MLC memory devices require tight control of the threshold voltages in order to use multiple threshold levels per cell. One problem with non-volatile memory cells that are closely spaced, and MLC in particular, is the floating gate-to-floating gate capacitive coupling that causes interference between cells. The interference can shift the threshold voltage of neighboring cells as one cell is programmed.

MLC memory devices also have a lower reliability than SLC memory devices due, in part, to the increased quantity of states requiring more closely spaced threshold voltages. For example, a bad bit in a memory device used to store photographs can be tolerated more easily than a bad bit in a memory device that stores code. A bad bit in a photograph might only produce a bad pixel out of millions of pixels while a bad bit in code or other data could mean a corrupted instruction that affects the operation of an entire program.

A MLC memory device has two or more threshold voltage distributions, and has two or more data storage states corresponding to the voltage distributions. For example, a MLC memory device that can program 2-bit data has four data storage states (e.g., [11], [10], [01] and [00]). These states may correspond to the threshold voltage distributions of the MLC memory device. For example, assuming that the respective threshold voltage distributions of the memory cell are −2.7 V or less, 0.3 V to 0.7 V, 1.3 V to 1.7 V, and 2.3 V to 2.7 V, the states [11], [10], [01] and [00] correspond to −2.7 V or less, 0.3 V to 0.5 V, 1.3 V to 1.7 V, and 2.3 V to 2.7 V, respectively.

A reading operation of the flash memory device with multi-level cells may be carried out by detecting data of a multi-level cell. Detection can include, for example, determining a difference between cell currents flowing through a selected memory cell according to a constant amount of bit line current and a word line voltage of a step-shaped waveform.

A programming operation of the flash memory device with multi-level cell may be carried out by applying a predetermined program voltage to the gate of the selected memory cell and then applying a ground voltage to the bit line. A power supply voltage may then be applied to the bit line in order to prevent the programming. If the program voltage and the ground voltage are respectively applied to the word line and the bit line of the selected memory cell, a relatively high electric field is applied between a floating gate and a channel of the memory cell. Due to the electric field, electrons of the channel pass through an oxide layer formed between the floating gate and the channel, so that a tunneling occurs therein. In this manner, a threshold voltage of the memory cell programmed by an accumulation of the electrons in the floating gate may be increased.

Exemplary Timing Diagram for Data Page Operation

Figure 2B:
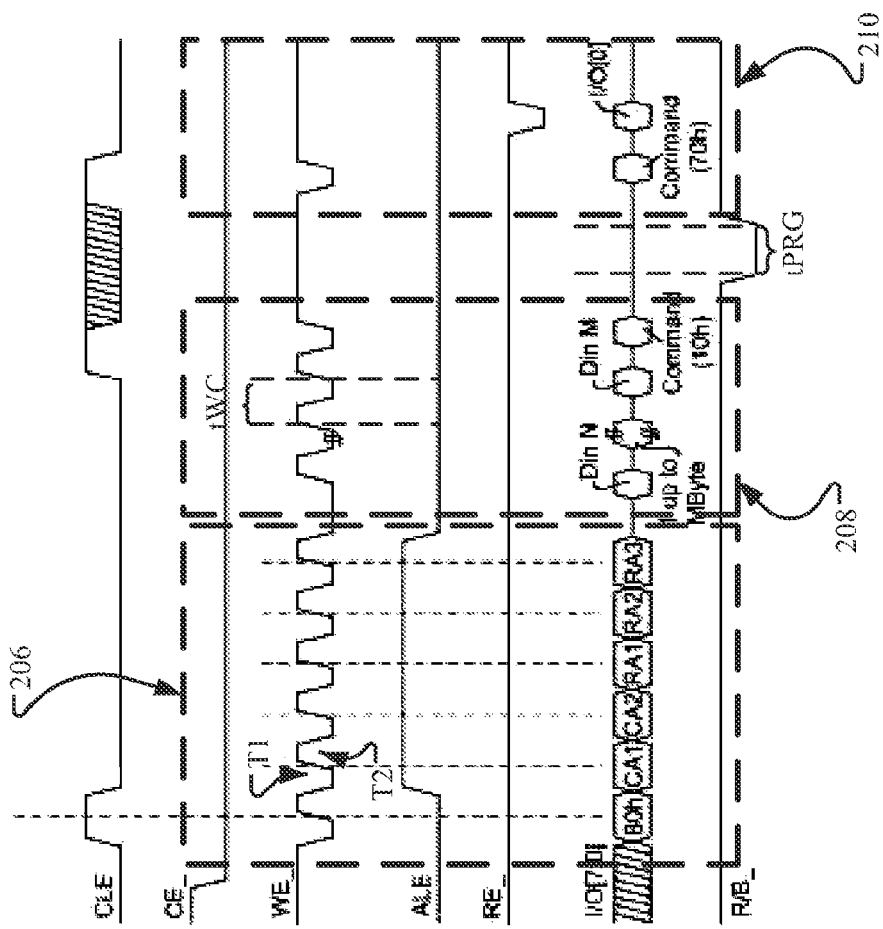
FIG. 2B shows an example timing diagram associated with each pin in a NAND flash interface during a data program operation.

FIG. 2B shows an example timing diagram associated with each pin in a NAND flash interface during a data program operation. Referring to FIG. 2B, region 206 may represent a period during which one or more commands may be sent to a flash memory device, while region 208 may represent a period during which programming data may be sent to the flash memory device, and region 210 may represent a period during which a status check may be sent to the flash memory device for checking status of the memory device.

As shown, command "80h" appearing on the data in/out I/O [7:0] pin may indicate serial data input (e.g., $D_{in}N \ldots D_{in}M$). Command "10h" may indicate an auto program, followed by a status read as indicated by command "70h". I/O [0]="0" may indicate an no-error condition, while I/O[0]="1" may indicate that an error in auto programming has occurred.

Also, as already discussed, the ready/busy output signal "RB_" may be logic low, indicating a busy state. In some implementations, the duration of the low logic state of the ready/busy output signal "R/B_" may range in the order of hundreds of µs. Also, a rising edge of the read enable signal "RE_" can trail a rising edge of the write enable signal "WE_" by a period of time. In some implementations, this period of time may be in the range of about 60 ns.

Also, as shown in FIG. 2B, the timing period "tPRG", which spans from the trailing edge to the rising edge of the ready/busy output signal "R/B_", may indicate a program time for programming data. In some implementations, the program time "tPRG" may be in the range of about 200 µs to about 700 µs for a SLC device or in the range of about 800 is to about 3 ms for a MLC device.

In some implementations, the program time "tPRG" may be similar to the "tR" period but for programming data as opposed to reading data. During the "tPRG" period, the ready/busy output signal "R/B_" may be asserted as a logical "0", indicating that the flash memory is in a busy state, during which data, for example, may not be read or erase.

Exemplary Timing Diagram for Block Erase Operation

Figure 2C:
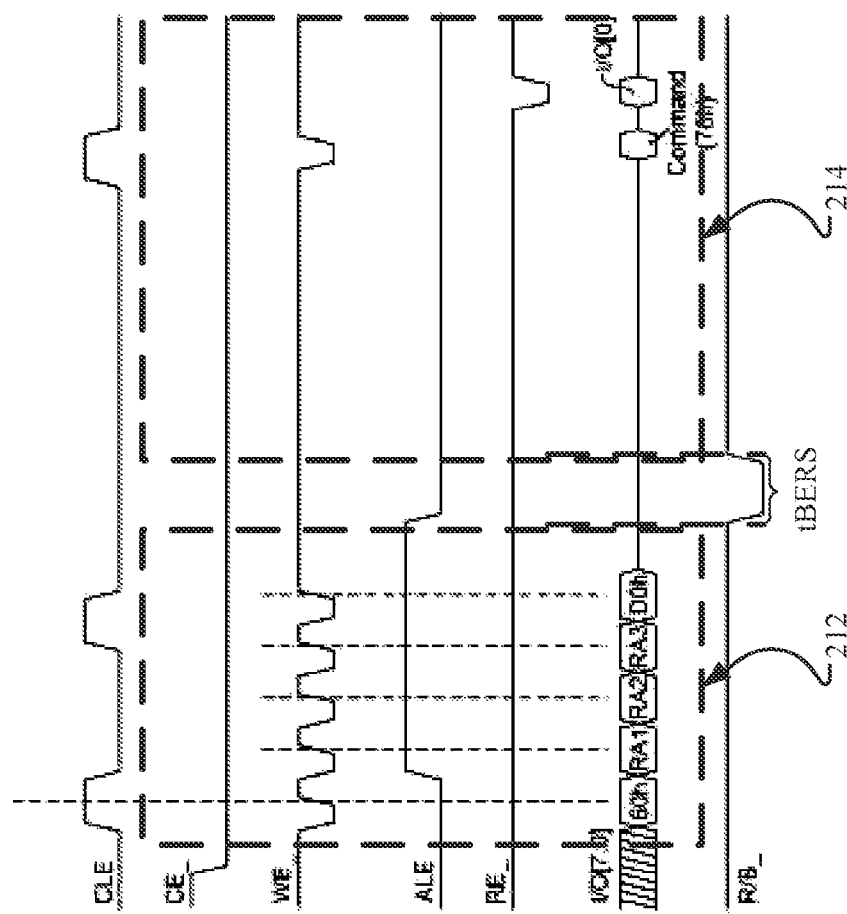
FIG. 2C shows an example timing diagram associated with each pin in a NAND flash interface during a block erase operation.

FIG. 2C shows an example timing diagram associated with each pin in a NAND flash interface during a block erase operation. Referring to FIG. 2C, region 212 may represent a period during which one or more commands may be sent to a flash memory device, while region 214 may represent a period during which a status check may be sent to the flash memory device for checking status of the memory device.

As shown, command "60h" appearing on the data in/out I/O [7:0] pin may indicate a block erase operation, with sequential row addresses (e.g., RA 1, RA 2, and RA 3) being supplied. Command "D0h" may indicate a cycle 2 block erase operation. The block erase operation may be checked by a status read (command "70h"), where I/O[0]="0" may indicate an no-error condition, while I/O[0]="1" may indicate that an error in block erase has occurred.

In this example, the ready/busy output signal "R/B_" may be logic low for a period of time such as in the range of about a millisecond (e.g., with a predetermined maximum). Similarly, a rising edge of the read enable signal "RE_" may trail a rising edge of the write enable signal "WE_". As another example, a rising edge of the write enable signal "WE_" corresponding to the "D0h" command and/or a falling edge of the ready/busy output signal "R/B_" may be in the range of about 100 ns.

Also, as shown in FIG. 2C, the timing period "tBERS", which spans from the trailing edge to the rising edge of the ready/busy output signal "R/B_", may indicate a block erase time for erasing block data.

In some cases, a block erase operation may not need to access the NAND flash I/O interface other than sending one or more block erase commands (or reading status commands if not using read a ready/busy output signal "R/B_"). The performance of a solid state drive system may rely on the block erase operation indirectly. In certain cases, at the very beginning of a block erase operation, the drive may determine that a number of erased pages are available for data programming. As a result, the drive may maintain a programming operation without the need of performing a block erase operation. However, as the data stored in the drive is modified along with the operation of the drive, less pages become available for data programming such that the drive would need to perform one or more block erase operations to vacant empty page(s) for data programming. Thus, a long "tBERS" period would yield a longer wait period for the solid state drive system to honor the PROGRAM commands. In other words, the impact of a block erase operation on the overall drive performance depends heavily on the garbage collection mechanism handled by the firmware (e.g., firmware 324).

In some implementations, the block erase time "tBERS" may be in the range of about 1.5 ms to about 2 ms for a SLC device or in the range of about 1.5 ms to about 10 ms for a MLC device. During the "tBERS" period, the ready/busy output signal "R/B_" may be asserted as a logical "0", indicating that the flash memory is in a busy state, during which data, for example, may not be read or written.

Solid State Drive

Figure 3:
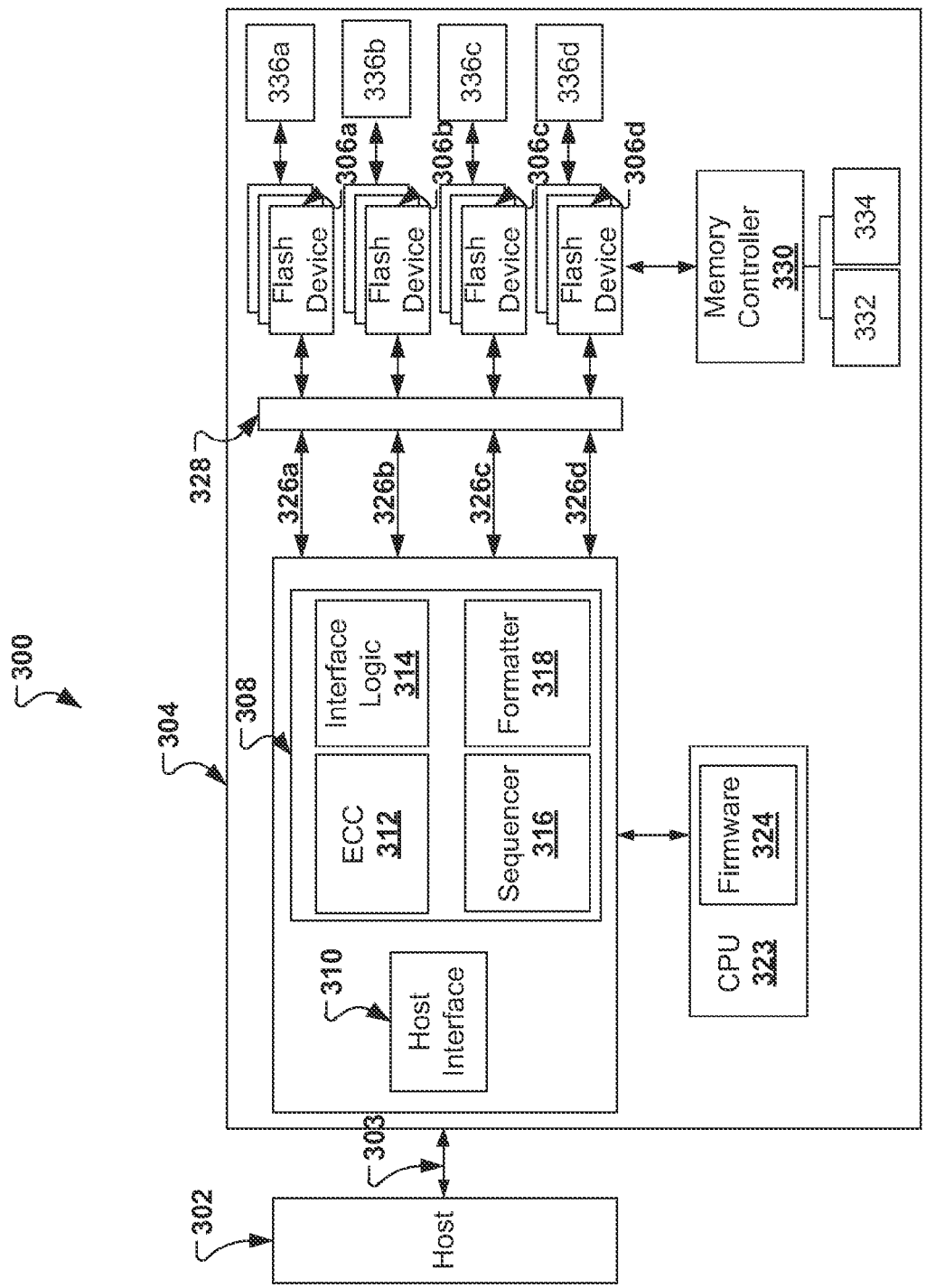
FIG. 3 shows an example solid state drive.

FIG. 3 shows an example solid state drive system 300. As shown in FIG. 3, the system 300 includes a host 302 and a solid state drive 304. The solid state drive 304 may include a host interface 310, central processor unit (CPU) 323, a memory controller interface 328, a memory controller 330 and one or more flash memory devices 306a-306d.

The host 302 may communicate with the solid state drive 304 through the host interface 310. The host interface 310, in some implementations, may include a Serial Advanced Technology Attachment (SATA) interface or a Parallel Advanced Technology Attachment (PATA) interface. A SATA interface or PATA interface may be used to convert serial or parallel data into parallel or serial data, respectively. For example, if the host interface 310 includes a SATA interface, then the SATA interface may receive serial data transferred from the host 302 through a bus 303 (e.g., a SATA bus), and convert the received serial data into parallel data. In other implementations, the host interface 310 may include a hybrid interface. In these implementations, the hybrid interface may be used in conjunction with, for example, a serial interface.

The host interface 310, in some implementations, may include one or more registers in which operating commands and addresses from the host 302 may be temporarily stored. The host interface 310 may communicate a write or read operation to a solid state controller 308 in response to the stored information in the register(s).

In some implementations, the solid state drive 304 may include one or more channels 326a-326d (e.g., four or eight channels), and each channel may be configured to receive one or more control signals (e.g., four chip enable signals) from the host 302 or from the flash memories 306a-306d.

Flash Memory Device

Each flash memory device 306, in some implementations, may include a nonvolatile memory (e.g., a single-level flash memory or a multi-level flash memory). In some implementations, the nonvolatile memory may include a NAND-type flash memory module. A NAND-type flash memory module may include a command/address/data multiplexed interface such that commands, data, and addresses may be provided through corresponding input/output pins. Advantages of using NAND-type flash memory, as opposed to a hard disk approach, include: (i) faster boot and resume times; (ii) longer battery life (e.g., for wireless applications); and (iii) higher data reliability.

In some implementations, each flash memory device may be connected to a channel 326. Each channel may support, for example, one or more input and output lines, chip select signal lines, chip enable signal lines and the like. The channel also may support other signal lines such as write enable, read enable, read/busy output, and reset signal lines. In some implementations, the flash memory devices 306a-306d may share a common channel. In other implementations, to increase the degree of parallelism, each flash memory device may have its own channel connected to the solid state drive 304. For example, flash memory device 306a may be connected to the solid state drive 304 using channel 326a; flash memory device 306b may be connected to the solid state drive 304 using channel 326b; flash memory device 306c may be connected to the solid state drive 304 using channel 326c; and flash memory device 306d may be connected to the solid state drive 304 using channel 326d.

In some implementations, the flash memory devices 306a-306d may be detachable. In some implementations, the flash memory devices 306a-306d may be connected to the solid state drive 304 using standard connectors. Examples of standard connectors may include, without limitation, SATA, USB (Universal Serial Bus), SCSI (Small Computer System Interface), PCMCIA (Personal Computer Memory Card International Association), and IEEE-1394 (Firewire).

In some implementations, each flash memory device 306 may include one or more solid state storage elements arranged in a bank. A solid state storage element may be partitioned into pages. In some implementations, a solid state storage element may have a capacity of 2000 bytes (i.e., one page). A solid state storage element, in some implementations, may include two registers to provide a total capacity of 4000 bytes (i.e., 4 kB).

In some implementations, each flash memory device 306 also may include one or more banks each being selected using a chip enable signal or chip select signal. The chip enable or chip select signal may select one or more solid state storage elements in response to a host command.

In some implementations, each solid state storage element may include one or more single-level cell ("SLC") devices. In some implementations, each solid state storage element may include one or more multi-level cell ("MLC") devices. The SLC or MLC devices may be selected using a chip enable signal or chip select signal, which may be generated by the solid state controller 308 using a combination of control and address information received from the host 302.

Where multiple banks are used, in some implementations, the solid state drive 304 may access more than one bank in a same flash memory device at the same time. In some implementations, the solid state drive 304 may access different banks in different flash memory devices at the same time. The capability to access more than one bank allows the solid state drive 304 to fully utilize the available resources and channels 326a-326d to increase the overall performance of the solid state drive 304. Furthermore, where the flash memory devices 306a-306d share a same memory input/output line and control signal (e.g., chip enable signal), the number of pins of the solid state controller 308 may be reduced to further minimize the cost for manufacturing the solid state drive 304.

Solid State Controller

The solid state controller 308 may receive one or more service requests or commands (e.g., read and program requests). The solid state controller 308 may be configured to handle any command, status, or control request for access to the flash memory devices 306a-306d. For example, the solid state controller 308 may be configured to manage and control storage and retrieval of data in the flash memory devices 306a-306d.

In some implementations, the solid state controller 308 may be a part of a microcomputer system under the control of a microprocessor (not shown). The solid state controller 308 may control the flow of commands and data between the host 302 and the solid state drive 304. In some implementations, the solid state controller 308 may include read-only memory (ROM), random-access memory (RAM) and other internal circuits. The solid state controller 308, in some implementations, may be configured to support various functions associated with the flash memory devices 306a-306d, such as, without limitation, diagnosing the flash memory devices 306a-306d, sending commands (e.g., activation, read, program, erase, pre-charge and refresh commands) to the flash memory devices 306a-306d, and receiving status from the flash memory devices 306a-306d. The solid state controller 308 may be formed on a different chip as the flash memory devices 306a-306d (e.g., formed on a same chip as the solid state drive 304) or on a same chip. The flash memory devices 306a-306d may be coupled with the memory interface 328. In some implementations, if the flash memory devices 306a-306d include NAND-type memory devices, the memory interface 328 may be a NAND flash input/output interface.

As shown in FIG. 3, the solid state controller 308 may include an error checking code module 312, interface logic 314, a sequencer 316 and a formatter 318. In some implementations, the solid state controller 308 may be coupled with the CPU 323 including embedded firmware 324 by which the solid state controller 308 may be controlled. The CPU 323 may include a microprocessor, a signal processor (e.g., a digital signal processor) or microcontroller. In some implementations, the CPU 323 with the embedded firmware 324 may reside outside of the solid state drive 304.

In some implementations, the solid state drive 304 (and/or the host 302) may be mounted on a system on-chip (SOC). The SOC, in these implementations, may be fabricated using, for example, a digital process. The SOC may include an embedded process system (e.g., an embedded CPU) separate from that in the solid state drive 304. The SOC also may include a SRAM, system logic, cache memory and cache controller for processing program code and data. The program code and data associated with the embedded process system may be stored in the flash devices 306a-306d, and communicated to the SOC through, for example, an SOC interface. The SOC interface may be used by a translator for translating information flowing between the interface and the internal bus structure of the SOC. Control signals may flow from the SOC to the flash devices 306a-306d while instructions and data may flow from the flash device 308 to the SOC during read operations. Instructions and data also may flow towards the flash devices 306a-306d such as when the main memory in the flash devices 306a-306d are in WRITE operations.

In some implementations, the flash devices 306a-306d may be controlled by the memory controller 330. The host 302 may communicate with the flash devices 306a-306d through the memory interface 328 coupled with the memory controller 330. In some implementation, the memory interface 328 may be a NAND flash interface.

The memory controller 330 may be connected to the flash memory devices 306a-306d through a corresponding pin or terminal. In these implementations, the memory controller 330 may be implemented as an application specific integrated circuit (ASIC) or a system on a chip (SOC). In addition, signal CNFG may connect through circuitry on flash devices 306a-306d in serial fashion.

Status Polling

As discussed above, the read/busy output signal "R/B_" in a particular logic state may indicate whether the output is busy. For example, the read/busy output signal "R/B_" in a low logic state may indicate a busy state at the output. In this example, the read/busy output signal "R/B_" may go logic high (i.e., become logic high which indicates a ready state) some period of time after the last rising edge of write enable signal "WE_".

Generally, a flash memory device only has one internal write charge pump. Therefore, writing data to the flash memory device (i.e., programming the device) puts the memory device into a busy state such that data cannot be read from the memory device during a write operation. If a read operation is performed during the busy state, a logical "00" may be returned. In this case, the busy state for a write operation may last several microseconds.

Similarly, initiating an erase operation of the flash memory device puts the memory device into the busy state. The device typically enters the busy state for 0.50-1.0 seconds during an erase operation. During this time, the device also is not accessible.

Lack of accessibility to the flash memory device during write and erase operations may cause a system implementing the flash memory device to operate slower than normal. The processor (e.g., CPU 323) or the memory controller 330 that is attempting to read the content of the flash memory device must wait until the write or erase operations are complete before being able to obtain the desired data.

Further, during this waiting period (e.g., during which write or erase operations are in process), the processor or the memory controller 330 may use the read/busy output signal "R/B_" to detect whether the flash memory device is in a ready condition (e.g., detect whether the flash memory device is ready to be read). If the flash memory device is busy, a busy status may be returned to the processor or the memory controller 330. If the flash memory device is idle, an idle status may be returned.

While the foregoing process to detect a ready/busy condition of the flash memory device allows the processor or the memory controller 330 to read (or write or erase) the content of the flash memory device immediately after other operations (e.g., write or erase operations) are finished, the flash memory device typically requires an additional pin count to support this process.

To avoid the need for an additional pin count, in some implementations, the processor or the memory controller 330 may utilize a polling method by sending a read status command (e.g., a status read command "70h") to the flash memory device to detect the ready or busy state (e.g., reading status of a command being executed, reading a busy/idle or pass/fail state of the command, and the like) of the flash memory device. In some implementations, a status register 336a-336d may be connected to the flash memory device for storing a status signal indicating an execution state of a write (or erase) operation. The processor or the memory controller 330 may perform a polling method by reading the status register 336a-336d of the flash memory device. In some implementations, the flash memory device may accept the read status command even if the flash memory device is in a busy state, as shown below in TABLE 3:

TABLE 3

| I/O | Page Program | Block Erase | Read | Definition |
| --- | --- | --- | --- | --- |
| I/O [0] | Pass/fail | Pass/fail | Not use | Pass "0" Fail "1" |
| I/O [1] | Not use | Not use | Not use | — |
| I/O [2] | Not use | Not use | Not use | — |
| I/O [3] | Not use | Not use | Not use | — |
| I/O [4] | Not use | Not use | Not use | — |
| I/O [5] | Not use | Not use | Not use | — |
| I/O [6] | Ready/busy | Ready/busy | Ready/busy | Busy "0" Fail "1" |
| I/O [7] | Write protect | Write protect | Write protect | Protected "0" Not protected "1" |

In some implementations, data polling may be set under the conditions that the chip enable signal (CE_) is set to a logic low while the write enable signal (WE_) is set to a logic high. In operation, the host (e.g., host 302) or the memory controller (e.g., memory controller 330) may output a write/erase busy signal to initiate a writing/erasing operation. The write/erase busy signal may set the status register 336a-336d of the flash memory device to logic "1". During this time, the CPU (e.g., CPU 323) may read the content of the flash memory device while the write (or erase) operation is in progress.

While the flash memory device accepts a read status command from the processor or the memory controller 330, the processor or the memory controller 330 continues polling for detecting the completion of writing or erasing or erasure throughout writing or erasing or erasure of the flash memory device, which can overload both the flash memory device and the processor or memory controller 330 with the polling results.

Thus, in some implementations, the memory controller 330 may include a programmable timer 332, and the programmable timer may be used to determine an initial wait time before polling (i.e., before sending a read status command). More specifically, the initial wait time may define a time period during which the memory controller 330 may wait before issuing a status check to the flash memory device (e.g., during a read, program or erase operation). In some implementations, the initial wait time may be determined based on one or more factors, such as the "tR", "tPROG" and "tBERS" parameters.

In some implementations, at the end of the initial wait time, the memory controller 330 may begin issuing one or more commands (e.g., read status command "70h") to check the status of the flash memory (e.g., ready/busy, pass/fail, etc.).

In some implementations, the memory controller also may include a second programmable timer 334 that may be used for controlling the interval between each command (e.g., read status commands). In some implementations, the appropriate value for the interval may be determined by the system firmware (e.g., firmware 324), and such a determination may be based on one or more parameters associated with power and performance (e.g., because frequent polling would increase performance but consume more power).

In some implementations, the second programmable timer 324 may control the precise period between each status check or each read status command. By controlling the initial wait time before issuing the read status command and the interval of each issued read status command, the memory controller 330 can timely detect the busy/ready condition of the flash memory.

Additionally, when a read status command is asserted, power consumption associated with the memory controller 330 and flash memory devices 306a-306d in executing the command may be increased. Further, if a particular channel is used for sending one or more READ status commands, the channel may be blocked, preventing a next command from being sent to another device (or delaying the execution of the next command). Thus, by controlling the interval of each issued read status command, the number of read status commands may be regulated. Regulating the number of read status command allows power associated with the memory controller 330 and the flash memory devices 306a-306d to be conserved, which can enhance the overall power performance of the memory controller 330 and flash memory devices 306a-306d (or the solid state drive 308).

While the above description pertains to a read command a read status command, it should be noted that one ordinary skill in the art would recognize that the foregoing description also may be applied to program operations. In these implementations, a program status command may be sent and regulated based on the polling process described above.

Figure 4:
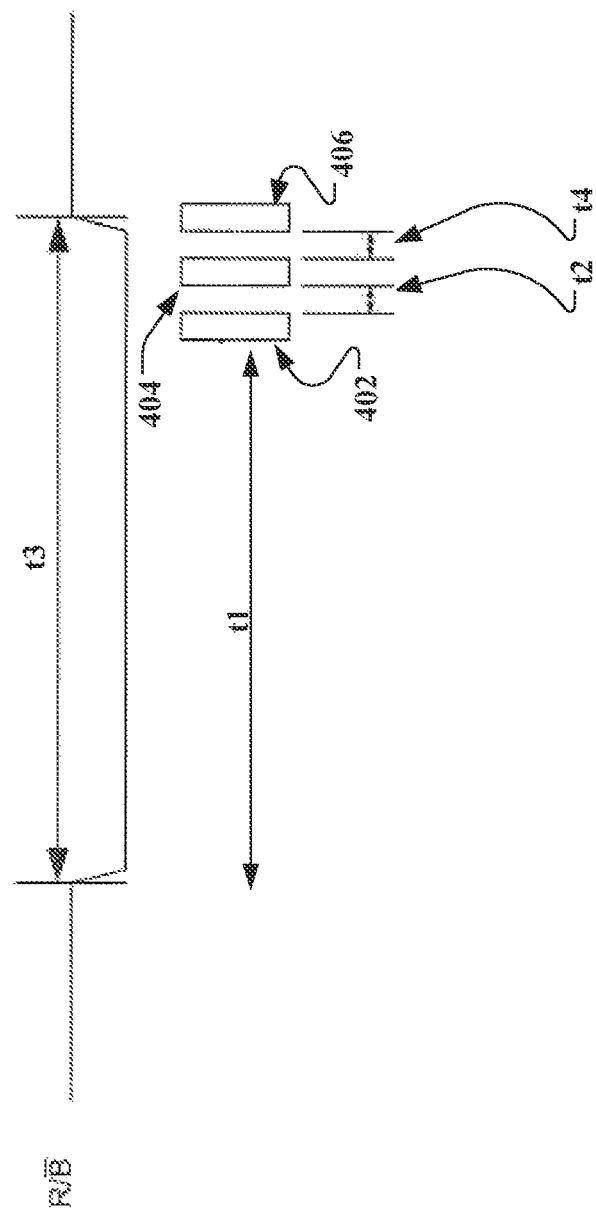
FIG. 4 shows an example initial wait time with respect to a read/busy output signal "RB_" of a flash memory device.

FIG. 4 shows an example initial wait time with respect to the read/busy output signal "R/B_" of a flash memory device.

As shown in FIG. 4, the timing period "t3", which spans from the trailing edge and to the rising edge of the read/busy output signal "R/B_" (e.g., during a logical "0" state), may indicate a reading time for reading data (e.g., "tR" shown in FIG. 2A), program time for programming data (e.g., "tPRG" shown in FIG. 2B), or a block erase time for erasing block data (e.g., "tBERS" shown in FIG. 2C).

During the timing period "t3", one or more read status commands 402, 404 and 406 may be transmitted to read the status of the flash memory device. In some implementations, the first read status command 402 may be sent after an initial waiting time "t1". In essence, the initial waiting time controls when status polling will take place. After the first read status command 402 is sent, a second read status command 404 may be sent. The second read status command 404 may be sent after a first interval time "t2" has expired. After the second read status command 404 has been sent, a third read status command 406 may be transmitted after a second interval time "t4". In some implementations, the first interval time "t2" and the second interval time "t4" may be the same. In other implementations, the first interval time "t2" and the second interval time "t4" may be different.

In the implementations shown above, both the initial waiting time "t1", the first interval time "t2" and the second interval time "t4" may be supplied by the clock generator of the memory controller 330. Alternatively, the initial waiting time "t1", the first interval time "t2" and the second interval time "t4" may be supplied by the internal clock of the flash memory device.

One advantage attributable to using a read status command for polling and controlling when the status read command is issued includes avoiding read incoherency of the internal registers of the flash memory device. This may be crucial for a status read where out of date information may provide the wrong indication to a processor or memory controller 330. The processor or the memory controller 330 may poll for program or erase status and correctly receive current and updated data by directly reading the register data stored in the status register 336a-336d.

Figure 5:
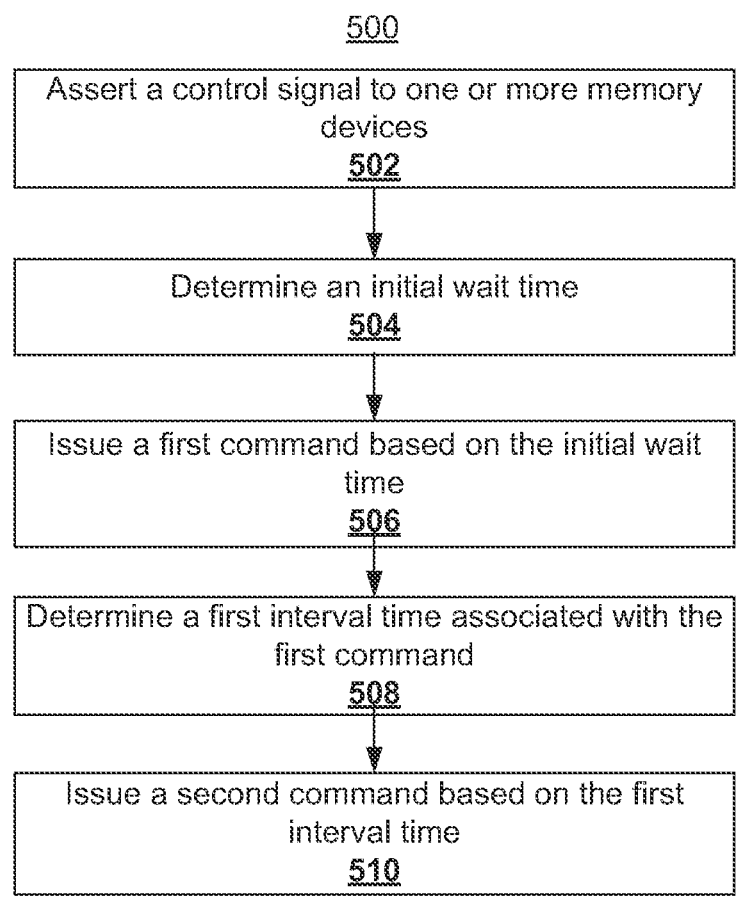
FIG. 5 shows an example process for issuing one or more read status commands.

FIG. 5 shows an example process 500 for issuing one or more read status commands. Process 500 may be performed, for example, by the solid state drive 300, the solid state drive 304 or the memory controller 330. However, another apparatus, system, or combination of systems, may be used to perform the process 500.

Process 500 begins with asserting a control signal to one or more memory devices (502). In some implementations, asserting a control signal may include asserting a read enable, write enable or chip enable (or chip select) signal to one or more flash memory devices. The flash memory devices, in some implementations, may include NAND-type memory devices.

Then, an initial wait time may be determined (504). In some implementations, the initial wait time may include a time period during which a memory controller (e.g., memory controller 330) may wait before issuing a command to the flash memory devices (e.g., during a read, program or erase operation).

A first command may be issued based on the initial wait time (506). In some implementations, the memory controller may issue the first command after the initial wait time. In these implementations, the first command may be a status check command (e.g., a read status check command or a program status check command).

In some implementations, asserting a control signal may include asserting a read command to the one or more memory devices. In these implementations, issuing a first command then may include issuing a read status command based the initial wait time.

In other implementations, asserting a control signal may include asserting a program (or write) command to the one or more memory devices. In these implementations, issuing a first command then may include issuing a program status command based the initial wait time.

Next, a first interval time associated with the first command may be determined (508). The first interval time may be associated with the interval time between two read status commands. For example, a first read status command may be sent after the initial wait period. After the first read status command is sent, a second read status command may be sent to the flash memory device. The second read status command may be sent after the first interval time has expired. After the second read status command has been sent, a third read status command may be transmitted after a second interval time.

A second command may then be issued based on the first interval time (510). In some implementations, a second interval time associated with the second command also may be determined as discussed above. The second interval time, in these implementations, may be determined with respect to the second command and a third command. Based on the second interval time, the third command may be issued.

In some implementations, operations 502-510 may be performed in the order listed, in parallel (e.g., by the same or a different program or thread executing on one or more processors, substantially or otherwise non-serially), or in reverse order to achieve desirable results. In other implementations, operations 502-510 may be performed out of the order shown. Also, the order in which the operations are performed may depend, at least in part, on which entity performs the process 500. Operations 502-510 further may be performed by the same or different entities or systems.

Read Cycle Time and Write Cycle Time

Conventional solid state storage devices employ multi-dimensional memory array systems to increase performance and maximize capacity. However, conventional solid state systems are not typically adapted to utilize solid state storage devices of different types in a same system. For example, a conventional solid state system cannot utilize both single level cell devices and multi-level cell devices in the same system efficiently. As an example, if the read/busy out signal "R/B_" is not used and only a single timer is provided for both SLC and MLC, it may be difficult to find an optimal setting for the single timer which works good for both SLC and MLC (e.g., because SLC and MLC have different optimal "tR", "tPROG" and "tBERS" periods). Thus, when a small timer is selected for optimal SLC performance, the timer may not be suitable for achieving maximum MLC performance (e.g., in terms of power). Similarly, if a big timer is used for achieving maximum MLC performance (e.g., to reduce power), SLC status may not be detected in a timely manner, thus causing performance degradation.

While slower devices such as MLC devices generally cost less and may be used to meet conventional capacity requirement and lower the overall cost of the storage device implementing the MLC devices, MLC devices may not be used in the same system as the faster devices such as SLC devices due to, for example, parameter conflicts. For example, SLC devices and MLC devices often require different manufacturer requirements and specification for data access (e.g., different timing parameters).

For example, referring back to FIG. 2A, to execute a read operation, the read enable signal (RE_) may be asserted and toggled between logical "1" and logical "0" for a predetermined number of cycles (e.g., when the flash memory device is operating in the data transfer region 204). A single cycle may be defined by the period of the read cycle time "tRC". More specifically, the read cycle time "tRC" may define a reading time during which data from the flash memory device may be read.

In some implementations, the read cycle time "tRC" may be about 50 ns (e.g., for MLC devices). More specifically, in the example shown, the read cycle time "tRC" may include a first timing period T1 and a second timing period T2. The first timing period T1 and the second timing period T2 may define the flash access timing associated with each read cycle time "tRC". In some implementations, the first timing period T1 may span a duration period of 4*T, where T is 160 MHz or about 6.25 ns. In other words, the first timing period T1 may be about 25 ns in length. In these implementations, the second timing period T2 also may span a duration period of 4*T or about 25 ns in length. A first timing period T1 of about 25 ns and a second timing period T2 of about 25 ns in length would then yield a total read cycle time "tRC" of about 50 ns.

In other implementations, the read cycle time "tRC" may be about 25 ns (e.g., for SLC devices). For example, the first timing period T1 may span a duration period of 2*T, where T is 160 MHz or about 6.25 ns. In other words, the first timing period T1 may be about 12.5 ns in length. In some implementations, the second timing period T2 also may span a duration period of 2*T or about 12.5 ns in length. A first timing period T1 of about 12.5 ns and a second timing period T2 of about 12.5 ns in length then yield a total read cycle time "tRC" of about 25 ns.

The read cycle time "tRC" need not be limited to the timing period shown above, and other read cycle time periods also are contemplated. For example, depending on a particular design and application, in some implementations, the read cycle time "tRC" may be in the range of 20 ns.

In some implementations, the read cycle time "tRC" (and the write cycle time "tWC" as will be discussed below) may be shorter (e.g., faster) than the cycle time associated with the read enable signal (or write enable signal with respect to the write cycle time "tWC"). In these implementations, the solid state drive system 300 may provide an SOC internal clock to generate both the read cycle time "tRC" and the write cycle time "tWC" as NAND flash I/O interface signals based on the read enable signal and the write enable signal. For example, if the low time and high time associated with a NAND flash read enable signal are 10 ns and 15 ns respectively, then the internal clock may be 200 Mhz (5 ns). Then, the value for the first timing period T1 may be programmed to allow a 2T cycle (e.g., 5 ns×2=10 ns) and the value for the second timing period T2 may be programmed to allow a 3T cycle (5 ns×3=15 n).

Referring to FIG. 2B, to execute a data program operation, the write enable signal (WE_) may be asserted and toggled between logical "1" and logical "0" for a predetermined number of cycles (e.g., when the flash memory device is operating in the command sending region 206). A single cycle may be defined by the period of the write cycle time "tWC". More specifically, the write cycle time "tWC" may define a writing time during which programming data from the flash memory device may be written.

In some implementations, the write cycle time "tWC" may be about 50 ns (e.g., for MLC devices). More specifically, in the example shown, the read cycle time "tRC" may include a first timing period T1 and a second timing period T2. The first timing period T1 and the second timing period T2 may define the flash access timing associated with each write cycle time "tWC". In some implementations, the first timing period T1 may span a duration period of 4*T, where T is 160 MHz or about 6.25 ns. In other words, the first timing period T1 may be about 25 ns in length. In some implementations, the second timing period T2 also may span a duration period of 4*T or about 25 ns in length. A first timing period T1 of about 25 ns and a second timing period T2 of about 25 ns in length would then yield a total write cycle time "tWC" of about 50 ns.

In other implementations, the write cycle time "tWC" may be about 25 ns (e.g., for SLC devices). For example, the first timing period T1 may span a duration period of 2*T, where T is 160 MHz or about 6.25 ns. In other words, the first timing period T1 may be about 12.5 ns in length. In some implementations, the second timing period T2 also may span a duration period of 2*T or about 12.5 ns in length. A first timing period T1 of about 12.5 ns and a second timing period T2 of about 12.5 ns in length then yield a total write cycle time "tWC" of about 25 ns.

Of course, the write cycle time "tWC" is not limited to the timing period shown above, and other write cycle time periods also are contemplated. For example, depending on a particular design and application, in some implementations, the write cycle time "tWC" may be in the range of 45 ns.

In general, the read cycle time "tRC" and the write cycle time "tWC" may be used as timing parameters for determining the overall performance of the data transfer rate. By adjusting the read cycle time "tRC" and the write cycle time "tWC" appropriately, the interface timing associated with the flash memory device may be controlled so that a mixture of SLC and MLC devices may be used. As an example, upon issuing a READ command, the solid state drive system 300 may wait for an internal buffer to be ready after a "tR" period as shown in FIG. 2A. Thereafter, data are shifted out from the internal buffer through the NAND interface to the solid state controller 308. The frequency of shifting then may be specified by the "tRC" period for a read operation (or by the "tWC" period for a programming operation). As discussed above, the maximum throughput may be given by "1/tRC" (e.g., a 40 MHz for a "tRC" period=25 ns). In other words, minimizing the "tRC" period (or the "tWC" period) allows an increase in bandwidth. Hence, by defining two different timing parameters (e.g., one configured for SLC devices and another configured for MLC devices as opposed to utilizing a same logic (timing parameters) to control the timing interface for both SLC and MLC devices), efficiency is significantly improved.

As another example, a solid state drive may utilize a first flash memory device with a read cycle time "tRC" of 25 ns and a write cycle time "tWC" of 25 ns, a second flash memory device with a read cycle time "tRC" of 25 ns and a write cycle time "tWC" of 45 ns, a third flash memory device with a read cycle time "tRC" of 20 ns and a write cycle time "tWC" of 20 ns, and a fourth flash memory device with a read cycle time "tRC" of 50 ns and a write cycle time "tWC" of 50 ns. In some implementations, because data are not shifted in or out during a block erase operation, a cycle time is not used for a block erase operation.

Figure 6:
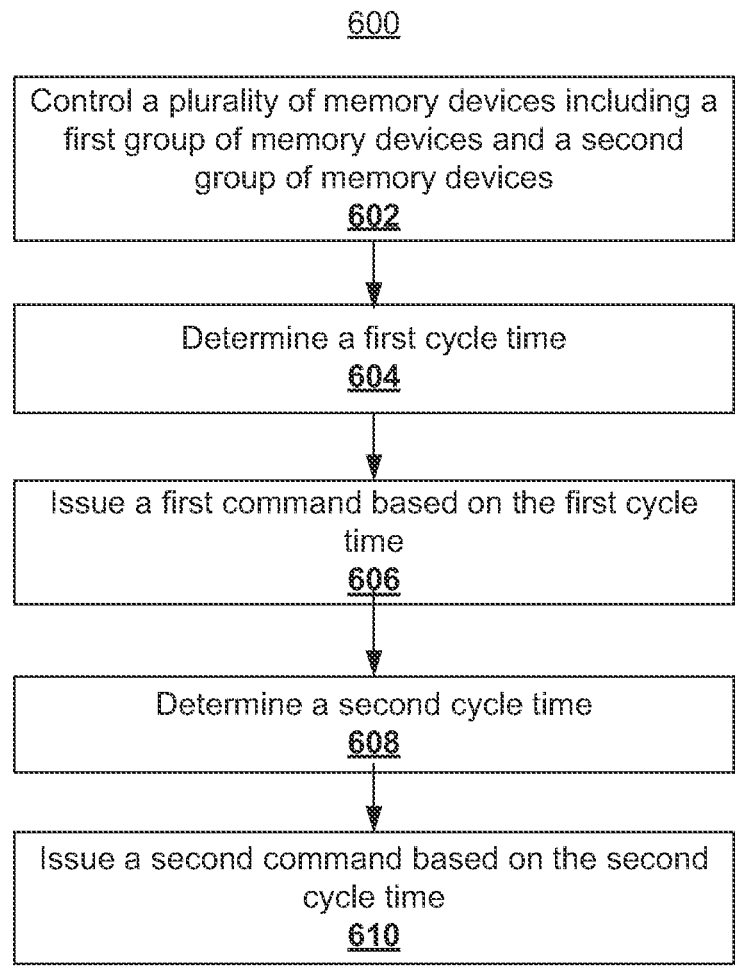
FIG. 6 shows an example process for status polling based on a write cycle time and a read cycle time.

FIG. 6 shows an example process 600 for status polling based on a write cycle time and a read cycle time. Process 600 may be performed, for example, by the solid state drive system 300, the solid state drive 304 or the memory controller 330. However, another apparatus, system, or combination of systems, may be used to perform the process 600. Process 600 begins with controlling a plurality of memory devices including a first group of memory devices and a second group of memory devices (602). In some implementations, the first group of memory devices may include single-level cell devices, while the second group of memory devices may include multi-level cell devices. In other implementations, the first group of memory devices may include multi-level cell devices, while the second group of memory devices may include single-level cell devices.

Next, a first cycle time may be determined (604). In some implementations, determining a first cycle time may include determining a first cycle time associated with a first group of memory devices. In these implementations, determining a first cycle time associated with the first group of memory devices may include determining a first timing parameter (e.g., the "tRC" period shown in FIG. 2A) and a second timing parameter (e.g., the "tWC" period shown in FIG. 2B), the first timing parameter and the second timing parameter being associated with a data transfer rate of the first group of memory devices (e.g., single-level cell devices). In some implementations, the first cycle time may be a read cycle time associated with a read operation during which data from at least one of the memory deices may be read. In other implementations, the first cycle time may be a program cycle time associated with a program operation during which data may be programmed into at least one of the memory devices.

Thereafter, a write command may be issued based on the first cycle time (606). In some implementations, the first command may be issued to the first group of memory devices based on the first cycle time. For example, a write enable signal (WE_) with a rising and falling edge corresponding to the first cycle time may be issued. The write enable signal (WE_) may toggle between logical "0" and logical "1" while a write operation is being processed.

After issuing a write command, a second cycle time is determined (608). In some implementations, determining a second cycle time may include determining a second cycle time associated with a second group of memory devices. The second group of memory devices may be different from the first group of memory devices. For example, the first group of memory devices may include single-level cell devices, while the second group of memory devices may include multi-level cell devices. In some implementations, determining a second cycle time may include determining the second cycle time independent of the first cycle time. For example, the "tRC" or "tWC" period associated with single-level cell devices may be determined separate from those associated with multi-level cell devices. In some implementations, the "tRC" or "tWC" period may be used to maximize a data transfer rate of a corresponding memory device.

In some implementations, a control signal (e.g., a read enable signal, a write enable signal or a chip enable signal) may be asserted to one of the first or second group of memory devices for a predetermined number of cycles. In these implementations, the predetermined number of cycles may include a first cycle associated with the first cycle time, the first cycle including a first timing period (e.g., the first timing period "T1" shown in FIGS. 2A and 2B) and a second timing period (e.g., the second timing period "T2" shown in FIGS. 2A and 2B). In these implementations, the first timing period and the second timing period of the first cycle may include a same or different duration.

In some implementations, the predetermined number of cycles may include a second cycle associated with the second cycle time, the second cycle including a first timing period (e.g., the first timing period "T1" shown in FIGS. 2A and 2B) and a second timing period (e.g., the second timing period "T2" shown in FIGS. 2A and 2B). In these implementations, the first timing period and the second timing period of the second cycle may include a same or different duration.

In some implementations, a wait period (e.g., the "tR" period shown in FIG. 2A) may be determined. The wait period may function as a wait time during which no command (e.g., read status or write status command) may be issued to either the first group of memory devices or the second group of memory devices. Thereafter, the first command or the second command may be issued to its corresponding group.

With the second cycle time determined, a second command may be issued based on the second cycle time (610). For example, a read enable signal (RE_) with a rising and falling edge corresponding to the second cycle time may be issued. The read enable signal (RE_) may toggle between logical "0" and logical "1" while a read operation is being processed.

In some implementations, operations 602-610 may be performed in the order listed, in parallel (e.g., by the same or a different program or thread executing on one or more processors, substantially or otherwise non-serially), or in reverse order to achieve desirable results. In other implementations, operations 602-610 may be performed out of the order shown. Also, the order in which the operations are performed may depend, at least in part, on which entity performs the process 600. Operations 602-610 further may be performed by the same or different entities or systems.

Example Implementations of Hard Disk Drive

Figure 7:
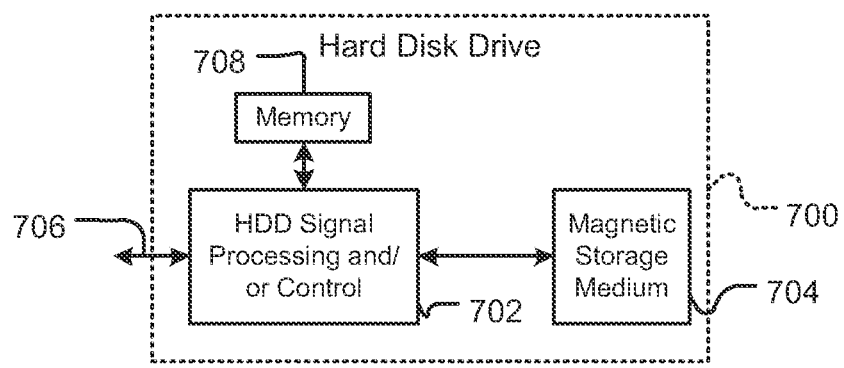
FIGS. 7-12 show various example electronic systems implementing a hard disk drive system.

FIGS. 7-13 show various example implementations of the described systems and techniques. Referring now to FIG. 7, the described systems and techniques can be implemented in a hard disk drive (HDD) 700. The described systems and techniques may be implemented in either or both signal processing and/or control circuits, which are generally identified in FIG. 7 as 702. In some implementations, the signal processing and/or control circuit 702 and/or other circuits (not shown) in the HDD 700 may process data, perform coding and/or encryption, perform calculations, and/or format data that is output to and/or received from a magnetic storage medium 704.

The HDD 700 may communicate with a host device (not shown) such as a computer, mobile computing devices such as personal digital assistants, cellular phones, media or MP3 players and the like, and/or other devices via one or more wired or wireless communication links 706. The HDD 700 may be connected to memory 708 such as random access memory (RAM), low latency nonvolatile memory such as flash memory, read only memory (ROM) and/or other suitable electronic data storage.

Figure 8:
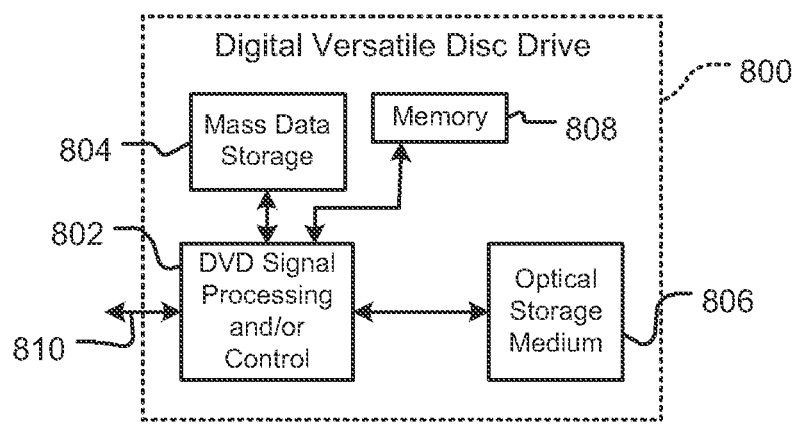

Referring now to FIG. 8, the described systems and techniques can be implemented in a digital versatile disc (DVD) drive 800. The described systems and techniques may be implemented in either or both signal processing and/or control circuits, which are generally identified in FIG. 8 as 802, and/or mass data storage 804 of the DVD drive 800. The signal processing and/or control circuit 802 and/or other circuits (not shown) in the DVD drive 800 may process data, perform coding and/or encryption, perform calculations, and/or format data that is read from and/or data written to an optical storage medium 806. In some implementations, the signal processing and/or control circuit 802 and/or other circuits (not shown) in the DVD drive 800 can also perform other functions such as encoding and/or decoding and/or any other signal processing functions associated with a DVD drive.

The DVD drive 800 may communicate with an output device (not shown) such as a computer, television or other device via one or more wired or wireless communication links 810. The DVD drive 800 may communicate with mass data storage 804 that stores data in a nonvolatile manner. The mass data storage 804 may include a hard disk drive (HDD). The HDD may have the configuration shown in FIG. 7. The HDD may be a mini HDD that includes one or more platters having a diameter that is smaller than approximately 1.8". The DVD drive 800 may be connected to memory 808 such as RAM, ROM, low latency nonvolatile memory such as flash memory and/or other suitable electronic data storage.

Figure 9:
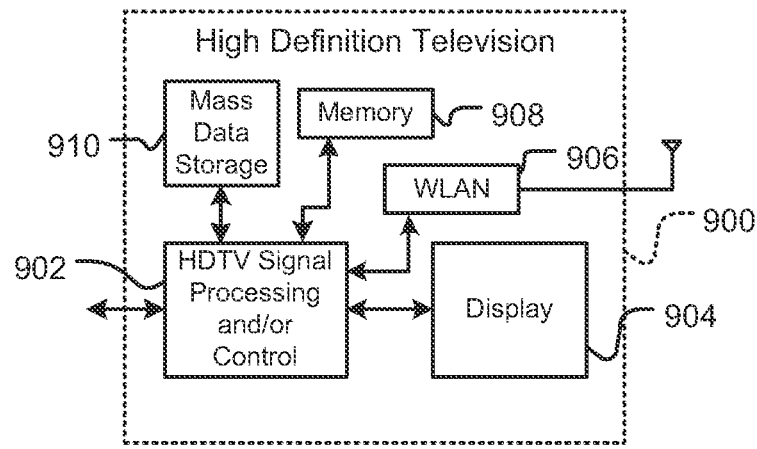

Referring now to FIG. 9, the described systems and techniques can be implemented in a high definition television (HDTV) 900. The described systems and techniques may be implemented in either or both signal processing and/or control circuits, which are generally identified in FIG. 9 as 902, a WLAN interface 906 and/or mass data storage 910 of the HDTV 900. The HDTV 900 receives HDTV input signals in either a wired or wireless format and generates HDTV output signals for a display 904. In some implementations, signal processing circuit and/or control circuit 902 and/or other circuits (not shown) of the HDTV 900 may process data, perform coding and/or encryption, perform calculations, format data and/or perform any other type of HDTV processing that may be required.

The HDTV 900 may communicate with mass data storage 910 that stores data in a nonvolatile manner such as optical and/or magnetic storage devices. At least one HDD may have the configuration shown in FIG. 7 and/or at least one DVD drive may have the configuration shown in FIG. 8. The HDD may be a mini HDD that includes one or more platters having a diameter that is smaller than approximately 1.8". The HDTV 900 may be connected to memory 908 such as RAM, ROM, low latency nonvolatile memory such as flash memory and/or other suitable electronic data storage. The HDTV 900 also may support connections with a WLAN via a WLAN network interface 906.

Figure 10:
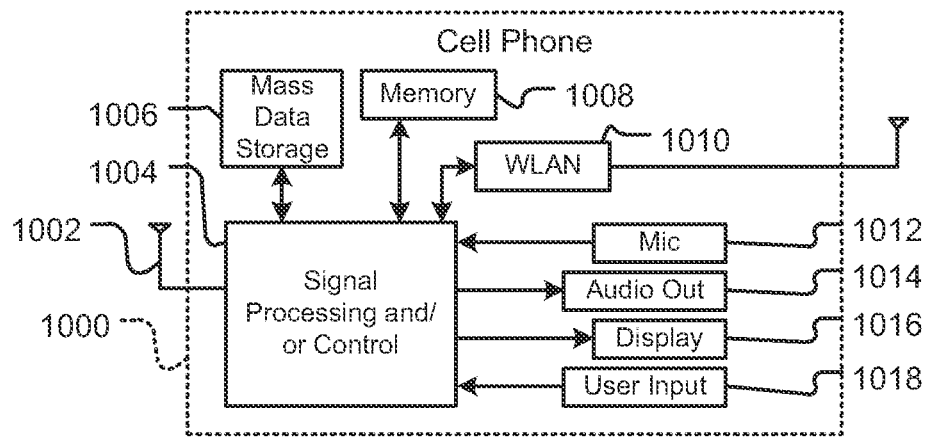

Referring now to FIG. 10, the described systems and techniques can be implemented in a cellular phone 1000 that may include a cellular antenna 1002. The described systems and techniques may be implemented in either or both signal processing and/or control circuits, which are generally identified in FIG. 10 as 1004, a WLAN interface 1010 and/or mass data storage 1006 of the cellular phone 1000. In some implementations, the cellular phone 1000 includes a microphone 1012, an audio output 1014 such as a speaker and/or audio output jack, a display 1016 and/or an input device 1018 such as a keypad, pointing device, voice actuation and/or other input device. The signal processing and/or control circuits 1004 and/or other circuits (not shown) in the cellular phone 1000 may process data, perform coding and/or encryption, perform calculations, format data and/or perform other cellular phone functions.

The cellular phone 1000 may communicate with mass data storage 1006 that stores data in a nonvolatile manner such as optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini HDD that includes one or more platters having a diameter that is smaller than approximately 1.8". The cellular phone 1000 may be connected to memory 1008 such as RAM, ROM, low latency nonvolatile memory such as flash memory and/or other suitable electronic data storage. The cellular phone 1000 also may support connections with a WLAN via a WLAN network interface 1010.

Figure 11:
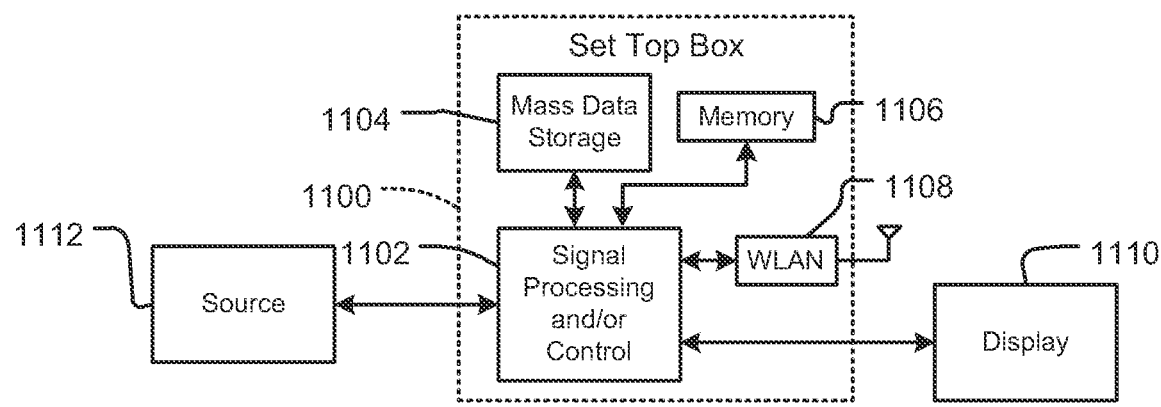

Referring now to FIG. 11, the described systems and techniques can be implemented in a set top box 1100. The described systems and techniques may be implemented in either or both signal processing and/or control circuits, which are generally identified in FIG. 11 as 1102, a WLAN interface 1108 and/or mass data storage 1104 of the set top box 1100. The set top box 1100 receives signals from a source 1112 such as a broadband source and outputs standard and/or high definition audio/video signals suitable for a display 1110 such as a television and/or monitor and/or other video and/or audio output devices. The signal processing and/or control circuits 1102 and/or other circuits (not shown) of the set top box 1100 may process data, perform coding and/or encryption, perform calculations, format data and/or perform any other set top box function.

The set top box 1100 may communicate with mass data storage 1104 that stores data in a nonvolatile manner. The mass data storage 1104 may include optical and/or magnetic storage devices for example hard disk drives HDD and/or DVDs. At least one HDD may have the configuration shown in FIG. 7 and/or at least one DVD may have the configuration shown in FIG. 8. The HDD may be a mini HDD that includes one or more platters having a diameter that is smaller than approximately 1.8". The set top box 1100 may be connected to memory 1106 such as RAM, ROM, low latency nonvolatile memory such as flash memory and/or other suitable electronic data storage. The set top box 1100 also may support connections with a WLAN via a WLAN network interface 1108.

Figure 12:
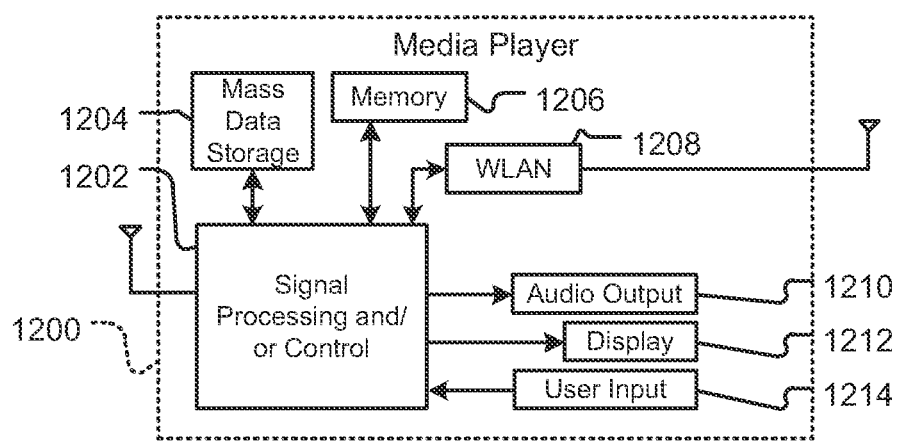

Referring now to FIG. 12, the described systems and techniques can be implemented in a media player 1200. The described systems and techniques may be implemented in either or both signal processing and/or control circuits, which are generally identified in FIG. 12 as 1202, a WLAN interface 1208 and/or mass data storage 1204 of the media player 1200. In some implementations, the media player 1200 includes a display 1212 and/or a user input 1214 such as a keypad, touchpad and the like. In some implementations, the media player 1200 may employ a graphical user interface (GUI) that typically employs menus, drop down menus, icons and/or a point-and-click interface via the display 1212 and/or user input 1214. The media player 1200 further includes an audio output 1210 such as a speaker and/or audio output jack. The signal processing and/or control circuits 1202 and/or other circuits (not shown) of the media player 1200 may process data, perform coding and/or encryption, perform calculations, format data and/or perform any other media player function.

The media player 1200 may communicate with mass data storage 1204 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVDs. At least one HDD may have the configuration shown in FIG. 7 and/or at least one DVD may have the configuration shown in FIG. 8. The HDD may be a mini HDD that includes one or more platters having a diameter that is smaller than approximately 1.8". The media player 1200 may be connected to memory 1206 such as RAM, ROM, low latency nonvolatile memory such as flash memory and/or other suitable electronic data storage. The media player 1200 also may support connections with a WLAN via a WLAN network interface 1208. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   asserting a control signal to one or more devices;
   determining an initial wait time after asserting the control signal;
   issuing a first command based on the initial wait time;
   determining a first interval time associated with the first command and a second command; and
   issuing the second command based on the first interval time.

2. The method of claim 1, where issuing a first command based on the initial wait time includes issuing the first command after the initial wait time.

3. The method of claim 1, further comprising:
   determining a second interval time associated with the second command and a third command; and
   issuing the third command based on the second interval time.

4. The method of claim 3, where the first interval time and the second interval time include a same duration.

5. The method of claim 3, where the first interval time and the second interval time include a different duration.

6. The method of claim 1, where asserting a control signal includes asserting a read command to the one or more devices, and
   where issuing a first command includes issuing a read status command based the initial wait time.

7. The method of claim 1, where asserting a control signal includes asserting a program command to the one or more devices, and
   where issuing a first command includes issuing a program status command after the initial wait time.

8. The method of claim 1, where asserting a control signal to one or more devices includes asserting a control signal to one or more memory devices.

9. A device comprising:
   a first programmable timer to specify an initial wait time associated with issuing one or more commands to at least one device; and
   a second programmable timer to specify an interval time to control a period between each issued command.

10. The device of claim 9, where the one or more commands are issued to the device after the initial wait time.

11. The device of claim 9, wherein the command includes one of a read, program or erase command.

12. The device of claim 9, further comprising:
    one or more channels coupled with the device, the one or more channels configured to receive more than one control signal.

13. The device of claim 12, wherein the more than one control signal includes a chip enable signal and a write enable signal.

14. The device of claim 13, where the initial wait time is implemented while the chip enable signal is logic low and the write enable signal is logic high.

15. The device of claim 9, where the first programmable timer specifies an initial wait time associated with issuing one or more commands to at least one memory device.

16. A system comprising:
    one or more devices; and
    a controller connected with the one or more devices, the controller configured to:
      assert a control signal to the one or more devices,
      determine an initial wait time after asserting the control signal,
      issue a first command based on the initial wait time,
      determine a first interval time associated with the first command and a second command, and
      issue the second command based on the first interval time.

17. The system of claim 16, wherein the one or more devices include one or more memory devices.

18. The system of claim 16, wherein the control signal includes a read command, and the first command includes a read status command.

19. The system of claim 16, wherein the control signal includes a program command, and the first command includes a program status command.

20. The system of claim 16, further comprising:
a first programmable timer configured to specify the initial wait time for controlling a period between asserting the control signal and issuing the first command; and
a second programmable timer configured to specify the interval time for controlling a period between issuing each command.

* * * * *